United States Patent [19]

Scott

[11] 4,155,544
[45] May 22, 1979

[54] SHEET FEEDING DEVICE AND METHOD

[75] Inventor: William R. Scott, Mesa, Ariz.

[73] Assignee: Pitney-Bowes, Inc., Stamford, Conn.

[21] Appl. No.: 865,474

[22] Filed: Dec. 29, 1977

[51] Int. Cl.² .......................... B65H 9/20; B65H 25/14
[52] U.S. Cl. ..................................... 271/8 R; 271/265; 271/145; 271/117
[58] Field of Search ............... 271/8 R, 264, 258, 259, 271/145, 117, 9, 265

[56] References Cited

U.S. PATENT DOCUMENTS

| | | | |
|---|---|---|---|
| 3,920,238 | 11/1975 | Kitajima et al. | 271/9 |
| 3,955,811 | 5/1976 | Gibson | 271/117 |
| 3,977,666 | 8/1976 | Suzuki | 271/9 |

Primary Examiner—Robert B. Reeves
Assistant Examiner—Brian M. Bond
Attorney, Agent, or Firm—Martin D. Wittstein; William D. Soltow, Jr.; Albert W. Scribner

[57] ABSTRACT

Sheet feeding device and method for feeding sheets of two different regular lengths, comprising a sheet length detector for automatically sensing the length of the next sheet in the sheet-supply station of the device, prior to movement of said sheet and conveying this information to the logic system which controls the operation of the machine. The detector is attached to the machine for automatic movement into the sheet-supply station, which is normal operating position, and for automatic withdrawal out of the sheet-supply station to provide easy access to the sheet-supply station for the insertion of new sheet stacks and to prevent damage to the sensitive detector during the insertion of such sheet stacks.

11 Claims, 6 Drawing Figures

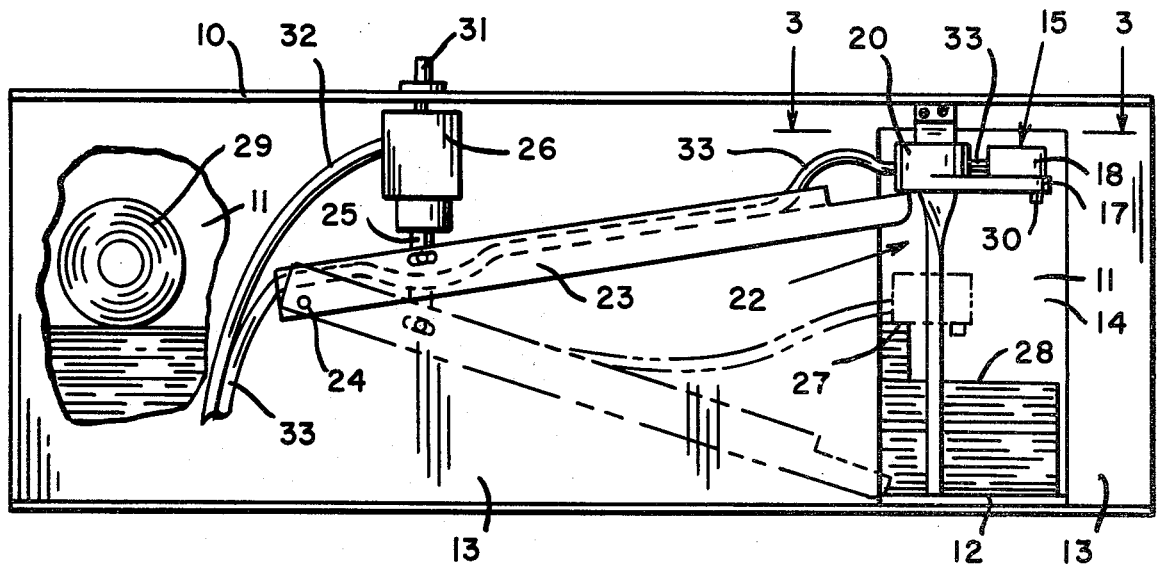
FIG. 1
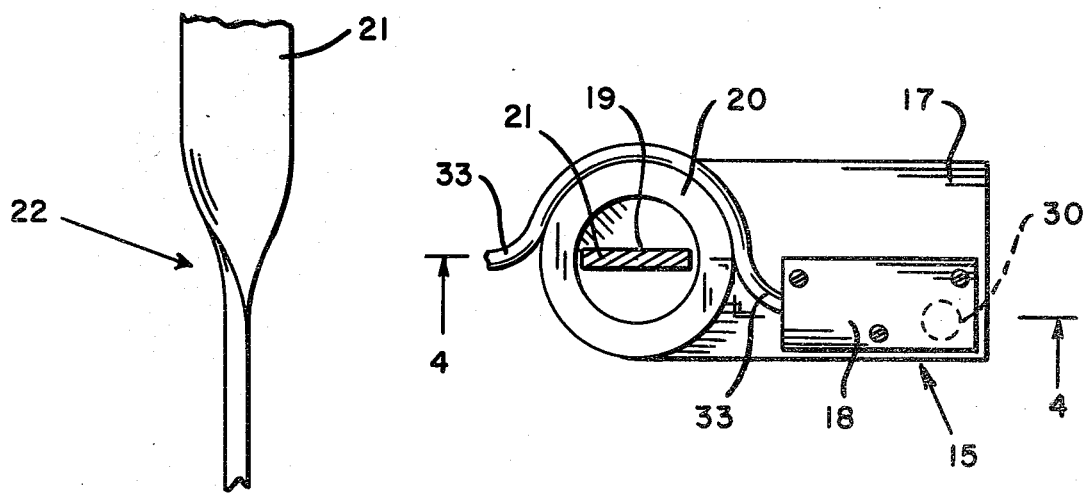
FIG. 2
FIG. 3

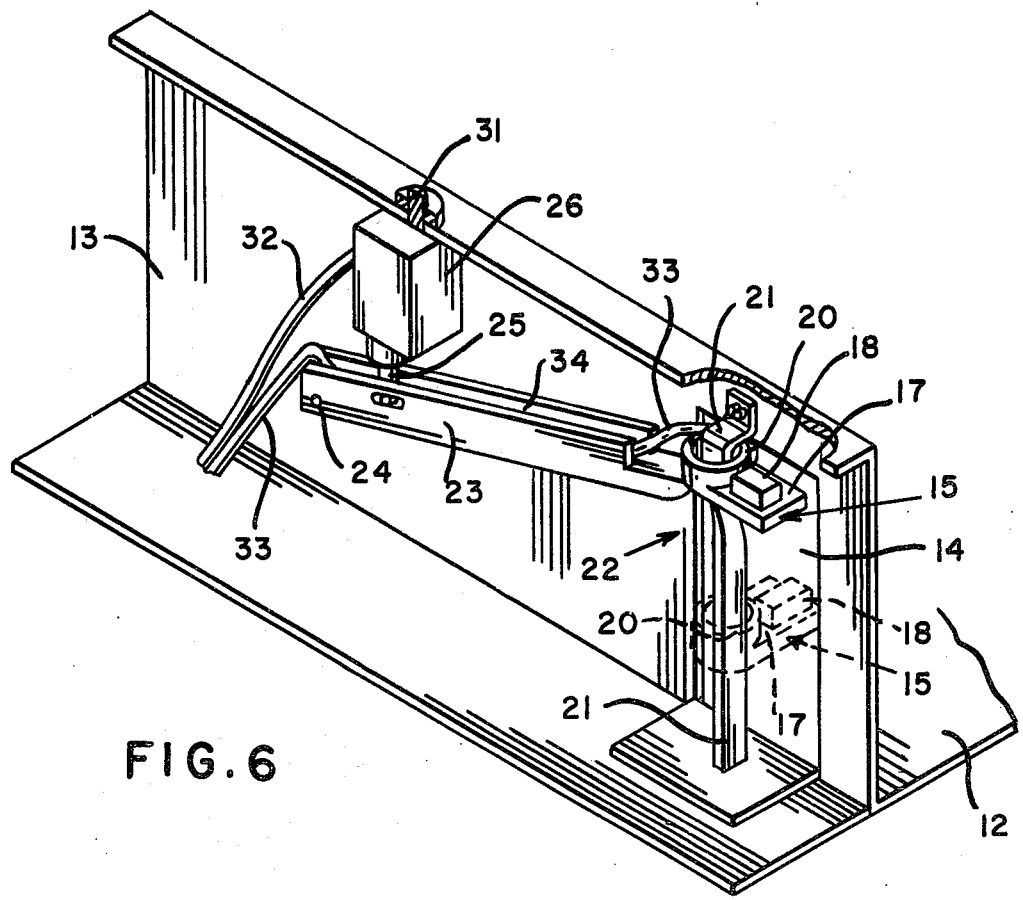
FIG. 6
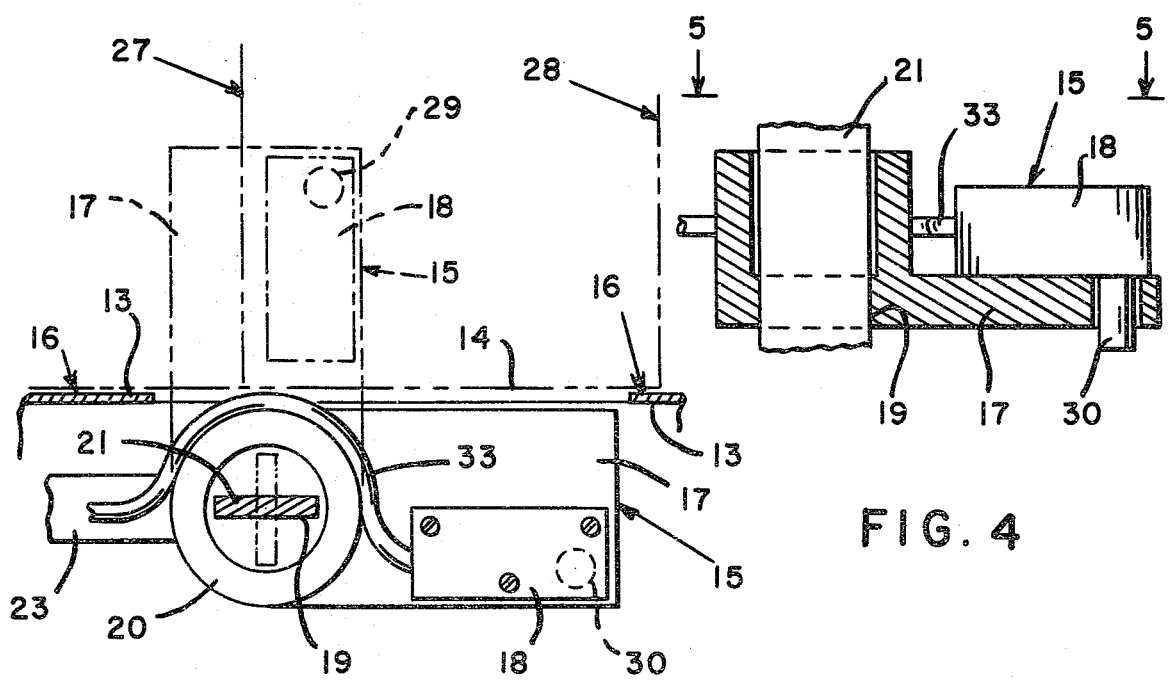
FIG. 5
FIG. 4

4,155,544

SHEET FEEDING DEVICE AND METHOD

FIELD OF THE INVENTION

The present invention relates to sheet feeding devices adapted to feed and treat sheets of two different regular lengths, such as in copying or duplicating machines adapted to feed copy sheets of letter size (8½"×11") and/or legal size (8½"×13") and to treat such copy sheets by forming duplicate images thereon corresponding to the images present on an imaged original sheet. More particularly, the present invention relates to such devices comprising a sheet length detector for use in such machines in the area of the sheet-supply station thereof and adapted to signal the machine regarding the length of the next copy sheet to be fed prior to any movement of such sheet.

BACKGROUND OF THE INVENTION

A wide variety of sheet-sensing devices are known for use on machines adapted for the feeding and treatment of sheet lengths. Such devices, generally photoelectric in nature, sense the movement of sheets, such as paper sheets, and provide a signal when each sheet legth enters and/or passes the location of the sensing device, said signal activating or deactivating a work station.

Certain sheet-feeding and treating machines adapted to feed and treat sheets of different lengths, such as certain copying and duplicating machines, are provided with manual switch means whereby the operator activates the switch to signal the machine regarding the length of the next copy sheet to be fed. This activates the machine logic or timing sequence in advance of the sheet movement, whereby the copy sheet is fed into proper position for the formation of duplicate images thereon, corresponding to the location of original images on an original sheet. If the operator neglects to set the switch to the proper sheet length, the machine logic will not correspond to the copy sheet length and the machine will malfunction, in that the timing sequence for each of the work stations in the machine, i.e., electrostatic image formation, image transfer, image fusing, copy discharge, etc., will be longer or shorter than necessary, resulting in defective copies and/or jamming of the paper in the machine and/or a longer period of time to produce a single copy or a succession of copies than is necessary. Also, the possibility of machine breakdown and/or fire is increased in cases where the copy paper becomes jammed and/or overexposed, particularly in the heating or fusing station.

It is expensive and impractical to provide machines with sensing devices which sense the length of sheets during passage of such sheets therethrough, particularly in cases where the distance which the sheet travels through the machine is short, as is the case with most office copying machines. Such machines require a more sophisticated logic system, capable of making changes during movement of the copy sheets therethrough. It is far simpler and less expensive to provide a machine with means for sensing the length of sheets before movement of the sheets therethrough but such means must, of necessity, be located in the sheet-supply station. This requirement has presented a major obstacle, up until the present invention, because of the fact that the sheet-supply station must be free of encumbrances which deny the operator easy access to the sheet-receiving areas or which increase the time and/or skill required to supply new sheets to such areas, and also because the sheet length detector is a sensitive device subject to damage if contacted during the frequent sheet-replacement operations.

BRIEF STATEMENT OF THE INVENTION

The present invention relates to a method and a device for automatically and individually feeding sheets of two different regular lengths and providing a signal in advance of the movement of said sheets indicative of the length of the next sheet to be fed. The present sheet-feeding devices comprise a sheet-supply station containing means for receiving a stack of superposed sheets of two different regular lengths so that the leading edges of said sheets are located at a common starting point within said station and the difference in the length of said sheets is present adjacent the trailing edges thereof, a sheet length sensor assembly comprising a base plate and an actuator which projects below said base plate a distance less than the thickness of the sheets being sensed and is adapted to provide one signal when it is in its normal position projecting below said base plate and another signal when it is depressed by contact with a sheet. The sensor assembly is supported for vertical movement within said sheet-supply station between a raised position above and out of contact with any sheets present in said station to permit free access to said station, and a lowered position in which it engages the trailing edge of the uppermost sheet present in the station, the base plate overlapping and contacting the trailing edge of the uppermost sheet, regardless of its length, and the actuator being positioned on the base plate so as to overlie the trailing edge of only the long sheets so that the actuator is depressed to provide another signal only when the base plate engages a long sheet as the uppermost sheet. The sensor assembly is supported for automatic movement between its raised and lowered positions, and means are provided for receiving the signal from said sensor indicating the length of the next sheet to be fed through the device before the sheet actually moves. More particularly, the present invention provides such a device in which the sheet length detector is mounted for automatic movement out of the sheet-supply station to provide easy access to the station for the free insertion of additional stacks of sheets to be fed through the machine.

BRIEF DESCRIPTION OF THE DRAWINGS

FIG. 1 is a side elevation view of the sheet-supply station of a sheet feeding and treatment machine according to the present invention, a part of the machine being cut away for purposes of illustration.

FIG. 2 is an enlarged plan view of a segment of the sensor guide rail of FIG. 1;

FIG. 3 is a sectional view taken along the line 3—3 of FIG. 1;

FIG. 4 is a sectional view taken along the line 4—4 of FIG. 3;

FIG. 5 is a sectional view taken along the line 5—5 of FIG. 4, the sensor assembly also being shown by means of broken lines lowered into active sensing position within the sheet-supply station for purposes of illustration;

FIG. 6 is a perspective view of the sheet-supply station and sheet length indicator mechanism of the present invention, illustrating the sensor assembly, both in raised stand-by position and in lowered sensing position.

DESCRIPTION OF THE PREFERRED EMBODIMENTS

Referring to FIGS. 1 and 6 of the accompanying drawing, the present sheet feeding device 10 comprises a sheet-supply station 11 having a sheet stack supporting floor 12, a sheet guide side wall 13 and an opening 14 in said wall 13 adapted to permit free vertical movement of a sensor assembly 15 within the sheet-supply station 11 and to permit retraction of said assembly 15 out of the station 11 and beyond the inner surface 16 of the guide wall 13 when the sensor assembly 15 is raised out of normal sensing position into stand-by position, the stand-by position being illustrated by solid lines in FIGS. 1 and 6 and sensing position being illustrated by broken lines in FIGS. 1 and 6.

The sensor assembly 15 comprises a sensor mounting plate 17, a sensor 18 attached thereto, a rectangular guide slot or opening 19 and stabilizer guide sleeve 20, as shown more clearly in FIGS. 3 to 5. The sensor assembly 15 is mounted on sensor guide rail 21 having a uniform rectangular cross-section with dimensions sufficiently smaller than the rectangular opening 19 of the sensor mounting plate 17 to permit free vertical sliding movement of sensor assembly 15 on guide rail 21.

As shown most clearly in FIG. 2, the guide rail 21 is provided with a 90° twist 22 at a location adjacent the uppermost portion thereof, whereby when the sensor assembly 15 is moved vertically on the guide rail 21 to raised or stand-by position, from lowered or sensing position, the rectangular guide slot or opening 19 of the sensor assembly 15 follows the twist 22 as the assembly 15 passes thereover, causing the sensor assembly 15 to pivot out of the sheet-supply station 11, beyond the inner surface 16 of the side guide wall 13, as illustrated by FIGS. 5 and 6. The cross-section of the mounting plate 17 must be relatively thin in the area of the rectangular opening 19 to permit free pivotal movement of the sensor assembly as it passes the twist 22 on rail 21. The guide sleeve 20 rides over the edges of the guide rail 21 to stailize the movement of the sensor assembly 15 at all times and functions as an upwardly extending flange which retains the sensor assembly 15 in a horizontal position, perpendicular to the rail 21.

Movement of the sensor assembly between stand-by position and sensing position is controlled by means of an actuator assembly comprising actuator arm 23 which is pivotably attached to the side guide wall 13 at 24 and is attached to the piston 25 of an actuator solenoid 26 which also is attached to the side guide wall 13 at a point closely spaced from arm pivot 24. The end of the actuator arm 23 engages the underside of the sensor mounting plate 17 to permit the arm to move the sensor assembly 15 up the guide rail 21 and to permit the sensor assembly 15 to rotate 90° when it passes the twist 22 adjacent the upper end of the guide rail 21.

As illustrated by FIGS. 1 and 5, the sheet-supply station 11 is adapted to contain sheets of two different uniform lengths, namely short sheets 27 and long sheets 28. The sheets may be in separate stacks, as shown by FIG. 1, or may be interleaved with each other, provided that the leading edges of all of the sheets are superposed over one another at the front of station 11 in the area of the sheet feed roller 29 so that the difference in sheet lengths is present at the trailing edges thereof, as illustrated.

The sensor assembly 15 is so located that when it is in the lowered or sensing position, shown by broken lines in FIGS. 1, 5 and 6, the underside of the sensor mounting plate 17 rests on the trailing edge of the short sheet 27, if such a sheet is at the top of the stack as it is in FIG. 1, and the sensor switch 30 of sensor 18, which extends below the undersurface of the mounting plate 17, is offset so as to be located beyond the trailing edge of the short sheets 27 overlying but out of contact with the long sheets 28, as shown in FIG. 5.

The sensor 18 is a conventional unit having a light force actuation switch 30, such units being commercially-available from a number of sources. The switch is capable of depression through a distance of a single sheet thickness or less, i.e., a distance of about 0.003 inch or less in the case of conventional copy paper. Thus, if the sensor assembly rests on a single short sheet 27 overlying a long sheet 28, the sensor switch 30 will not contact or be depressed or actuated by the long sheet 28.

In operation, the solenoid 26 is actuated by means of a solenoid actuator switch 31 which is shown in FIG. 1 as being associated with an access door to the paper supply area or which is actuated by lifting of the paper-containing tray, if one is designed into the machine.

Actuation of the solenoid 26 causes retraction of the piston 25 and lifting of the sensor arm 23 connected thereto. The sensor arm 23 engages and lifts the sensor assembly 15 up the sensor guide rail 21, out of contact with any copy sheets remaining in the sheet-supply station, as shown by FIGS. 1, 5 and 6. With the sensor assembly 15 in such position, the sheet-supply station is open to the free insertion of new stacks of sheets or of a tray containing such stacks of sheets, the sensor assembly being protected, outside the inner surface 16 of side guide wall 13, against the possibility of being damaged by contact with new stacks of sheets, the paper tray or the hands of the operator.

When the sheet-supply station 11 has been reloaded, the solenoid 26 is de-energized by means of the actuator switch 31, either manually or automatically, depending upon whether a manual switch button or an automatic contact switch is provided, whereby the piston 25 returns to extended position to push down the sensor arm 23 and permit the sensor assembly to slide down the guide rail 21, pivoting 90° into the sheet-supply station 11 as it passes twist 22 in rail 21, and coming to rest on the uppermost copy sheet. In such position the sensor 18 of assembly 15, which is electrically connected by means of wire 33 (shown in FIGS. 1, 5 and 6) to the logic system of the machine in the same manner as prior-known external manual indicator knobs, signals the logic system whether the sensor switch 30 is engaged by or out of engagement with the uppermost sheet in the stack. Thus, if the uppermost sheet is a short sheet 27, the underside of the sensor mounting plate 17 rests on the trailing edge thereof and the sensor switch 30 overlies the long sheet 28, out of engagement therewith and not actuated thereby, as shown by broken lines in FIG. 1. In such condition the sensor 18 supplies a signal to the machine logic system to pre-set the machine logic to the feeding of a short sheet 27.

Conversely, if the uppermost sheet in the stack is a long sheet 28, the undersurface of the sensor mounting plate 17 rests completely on the surface of the long sheet 28, causing the sensor switch 30 to be depressed and actuating the sensor 18 to supply a different signal to the machine logic system to pre-set the machine logic to the feeding of a long sheet 28.

Since the sensor assembly 15 is supported on the uppermost sheet 27 or 28 while in the down or sensing position, it will gradually move down the guide rail 21 as sheets are moved from the sheet stack through the machine. Thus, the sensor assembly 15 must not be attached to the sensor arm 23, and the sensor wire 33 must be sufficiently long and free of the sensor arm 23 to permit free positioning of the sensor assembly 15 on top of the highest sheet 27 or 28 in the sheet-supply station 11 when the sensor arm 23 is moved to the lowered or sensing position, as shown by means of broken lines in FIG. 1. This may be accomplished, as shown by FIG. 6, by providing an open channel 34 on the top side of arm 23 to support the sensor wire 33 and by providing sufficient slack in wire 33 so that when the sensor arm 23 is lowered to sensing position, the sensor assembly 15 is free to lose engagement with the end of arm 23 when assembly 15 becomes engaged by the uppermost sheet in station 11, the sensor wire 33 moving free of open channel 34 so as not to place a strain upon either the sensor assembly 15 or the sensor arm 23, as shown by FIG. 1.

As is clear from the foregoing, the present sheet length indicator system is completely automatic and not dependent upon any intervention of the machine operator. Moreover, the present system will function perfectly even if short and long sheets are interleaved at random so long as the leading edges of the sheets are positioned at the same starting position as far forward as possible in the sheet-supply station.

It should be understood that various changes and modifications will be apparent to those skilled in the art within the scope of the attached claims in the light of the present disclosure, including the drawings, particularly in connection with the use of the present method and sheet length detector for the processing of sheets of different types, such as metal, plastic, etc., for a variety of different purposes, such as cutting, stamping, painting, etc.

I claim:

1. A sheet feeding device for automatically and individually feeding sheets of two different regular lengths and providing a signal in advance of the movement of said sheets indicative of the length of the next sheet to be fed, comprising a sheet-supply station containing means for receiving a stack of superposed sheets of two different regular lengths so that the leading edges of said sheets are located at a common starting point within said station and the difference in the length of said sheets is present adjacent the trailing edges thereof, a sheet length sensor assembly comprising a base plate and an actuator which projects below said base plate a distance less than the thickness of the sheets being sensed and is adapted to provide one signal when it is in its normal position projecting below said base plate and another signal when it is depressed by contact with a sheet, means for supporting said sensor assembly for vertical movement within said sheet-supply station between a raised position in which it is located above and out of contact with any sheets present in said station to permit free access to said station, and a lowered position in which it is adapted to engage the uppermost sheet present in said station, the base plate of said sensor assembly being positioned so as to contact the trailing edge of the uppermost sheet, regardless of its length, and the actuator being positioned on said base plate so as to contact the trailing edge of only the long sheets, the actuator being depressed to provide another signal only when the base plate engages a long sheet as the uppermost sheet, means for automatically moving said sensor assembly between its raised and lowered positions, and means for receiving the signal from said sensor indicating the length of the next sheet to be fed through the device.

2. A sheet feeding device according to claim 1 which further comprises a vertical side wall enclosing said sheet-supply station and means for moving said sensor assembly beyond said side wall and out of said sheet-supply station when said sensor assembly is in the raised position.

3. A sheet feeding device according to claim 1 in which the means for supporting said sensor assembly for vertical movement comprises a vertical rail having a uniform cross-section, the sensor assembly being provided with a corresponding opening which engages said rail to provide free sliding movement thereover.

4. A sheet feeding device according to claim 3 in which said rail is provided with a twist adjacent the upper end thereof, whereby movement of said sensor assembly to the raised position causes the sensor assembly to pivot on said rail and to move out of the sheet-supply station.

5. A sheet feeding device according to claim 4 in which the cross-section of said sensor assembly is relatively thin in the area of said opening, and an upstanding flange member is provided on said assembly adjacent said opening to brace the sensor assembly in a position perpendicular to said rail while permitting free sliding and pivoting movement of said sensor assembly on said rail.

6. A sheet feeding device according to claim 1 in which said means for automatically moving said sensor assembly comprises an arm, one end of which is pivotally attached to said device and the other end of which is adapted to engage said sensor assembly, pivotal movement of said arm causing said sensor assembly to move between raised and lowered positions.

7. A sheet feeding device according to claim 6 which comprises a solenoid attached to said arm at a location intermediate its ends, and means for energizing said solenoid to cause pivotal movement of said arm and resultant movement of said sensor assembly between raised and lowered positions.

8. A sheet feeding device according to claim 6 in which said arm is free of attachment to said sensor assembly and is adapted for movement out of engagement with said sensor assembly when the sensor assembly is in lowered position.

9. A method for automatically and individually feeding sheets of two different regular lengths and providing a signal in advance of the movement of said sheets indicative of the length of the next sheet to be fed comprising the steps of (a) forming a stack of superposed sheets of two different regular lengths so that the leading edges of said sheets are located at a common starting point and the difference in the length of said sheets is present adjacent the trailing edges thereof, whereby the trailing edges of the longer sheets extend beyond the trailing edges of the shorter sheets in the stack, (b) contacting the surface of the uppermost sheet in the stack to automatically sense whether its trailing edge extends beyond the trailing edge of the other sheets in the stack and (c) providing a signal in advance of the movement of said uppermost sheet indicative of the length of said sheet.

10. Method according to claim 9 in which the surface of the uppermost sheet in the stack is contacted by a sensing device which is positioned to overlap the trailing edges of the sheets and to be actuated only by contact with the trailing edge of a longer sheet in said stack, whereby the sensing device provides one signal when it is not actuated, to indicate that the uppermost sheet is a short sheet, and a different signal when it is actuated, to indicate that the uppermost sheet is a long sheet.

11. Method according to claim 10 which comprises automatically moving said sensing device out of contact with said sheets to permit free access to the sheets in said stack.

* * * * *